United States Patent
Tsai (10) Patent No.: US 6,356,463 B1
(45) Date of Patent: Mar. 12, 2002

(54) HIGH FREQUENCY, VOLTAGE FEEDBACK CONTROL MODE POWER CONVERTER

(75) Inventor: Chia-Ming Tsai, Taipei (TW)

(73) Assignee: Phoenixtec Power Co. Ltd., Taipei (TW)

( * ) Notice: Subject to any disclaimer, the term of this patent is extended or adjusted under 35 U.S.C. 154(b) by 0 days.

(21) Appl. No.: 09/778,638

(22) Filed: Feb. 7, 2001

(51) Int. Cl.[7] .......................................... H02M 7/5387
(52) U.S. Cl. ............................. 363/17; 363/41; 363/98
(58) Field of Search ........................... 363/71, 26, 41, 363/97, 98, 132, 134

(56) References Cited

U.S. PATENT DOCUMENTS

| | | | | |
|---|---|---|---|---|
| 4,597,026 A | * | 6/1986 | Santurtan et al. | 361/101 |
| 5,253,155 A | * | 10/1993 | Yamamoto | 363/41 |
| 5,627,758 A | * | 5/1997 | Lansberry et al. | 363/98 |
| 5,671,130 A | * | 9/1997 | Kerkman et al. | 363/132 |
| 5,850,132 A | * | 12/1998 | Graces | 363/41 |
| 5,917,721 A | * | 6/1999 | Kerkman et al. | 363/98 |
| 5,990,657 A | * | 11/1999 | Masaki et al. | 363/160 |
| 6,002,213 A | * | 12/1999 | Wood | 305/307 |
| 6,134,133 A | * | 10/2000 | Noma et al. | 363/134 |
| 6,166,935 A | * | 12/2000 | Tokashiki et al. | 363/98 |
| 6,229,350 B1 | * | 5/2001 | Ricon-Mora | 363/41 |

* cited by examiner

*Primary Examiner*—Jeffrey Sterrett
(74) *Attorney, Agent, or Firm*—Alan Kamrath; Rider, Bennett, Egan & Arundel, LLP (57) ABSTRACT

A high frequency, voltage feedback control mode power converter having a microprocessor outputs a control clock signal and a simulated output voltage to control the dead-time value of a PWM controller. The control clock signal is decided by an input interrupt process program and an output interrupt process program written in the microprocessor. By appropriately providing the control clock signal for controlling the dead-time value of the PWM controller, the efficiency of the high frequency, voltage feedback control mode power converter is raised and an output steady response is also improved.

6 Claims, 7 Drawing Sheets

FIG.7

HIGH FREQUENCY, VOLTAGE FEEDBACK CONTROL MODE POWER CONVERTER

BACKGROUND OF THE INVENTION

1. Field of the Invention

The present invention relates to a high frequency, voltage mode control power converter, and more particularly to a power converter having a microprocessor applied to control the dead-time value of a pulse width modulation (PWM) controller so as to improve the output steady response of the power converter, and hence the efficiency of the power converter is raised.

2. Description of Related Art

A voltage feedback control loop is widely used in controlling a power converter. The basic conception of the voltage feedback control loop is that a voltage mode PWM controller (an integrated circuit) is used to control a power converter. When an oscillator in the voltage mode PWM controller continually generates a series triangle wave, the PWM controller synchronously turn on an active switch connected to a primary side of the power converter. As soon as an error amplifier in the voltage mode PWM controller receives a feedback output voltage from the power converter which generates an error signal intersecting the triangle wave, the active switch is turned off. By repeatedly turn on and turn off, the power in the primary side of the power converter is transferred to a secondary side of the power converter.

However, the power converter is only controlled by the voltage feedback control loop but without any current feedback, and hence the response of the power converter is totally depended on the output voltage of the power converter. In order to avoid the transient response of the output voltage becomes too slow, and for the purpose of decreasing the output ripple voltage, the bandwidth of the voltage feedback control loop is greatly raised. Once the bandwidth is over raised, some problems are occurred. A distortion phenomenon of an input current of the power converter is usually occurred, thus the root mean square value of the input current is also raised. A ripple of the input voltage is occurred as well and hence the input power is increased, so that the efficiency of the power converter is decreased.

On the contrary, if the bandwidth is lowered, the distortion phenomenon of the input current could be avoided, however the transient response of the output voltage becomes lower and the output ripple voltage is increased. Once the large transient response of the output voltage is occurred, the output voltage may become too high or low. If the output voltage is too high, some electrical components in the power converter are burned out because of the electrical stress problems.

If the current feedback control loop is applied to control the power converter, more electrical components, such as a current transformer, are needed, and hence the total cost of the power converter and circuit complexity are raised.

To overcome these shortcomings, the present invention tends to provide a high frequency, voltage feedback control mode power converter to mitigate and obviate the aforementioned problems.

SUMMARY OF THE INVENTION

The main objective of the invention tends to provide a power converter having a microprocessor applied to control the dead-time value of a pulse width modulation (PWM) controller so as to improve the total steady response, and raise the efficiency of the power converter.

Other objects, advantages and novel features of the invention will become more apparent from the following detailed description when taken in conjunction with the accompanying drawings.

DETAILED DESCRIPTION OF THE PREFERRED EMBODIMENT

Figure 1:
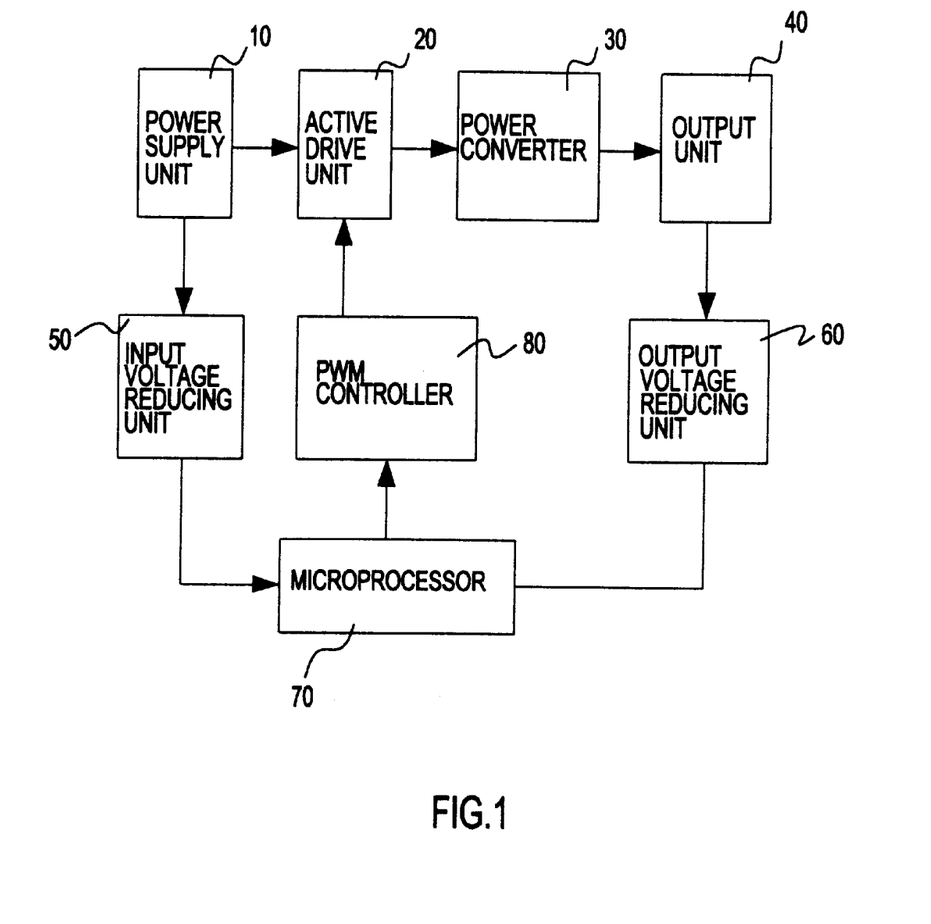
FIG. 1 is a block diagram showing that a high frequency, voltage feedback control loop power converter in accordance with the present invention.

With reference to FIG. 1, a high frequency, voltage feedback control mode power converter comprises a power supply unit (10), an active drive unit (20) connected to the power supply unit (10), a power converter (30) connected to the active drive unit (20), and an output unit (40) connected to the power converter (30). A microprocessor (70) is connected to the power supply unit (10) and the output unit (40) respectively via an input voltage reducing unit (50) and an output voltage reducing unit (60). An output of the microprocessor (70) is connected to a PWM controller (80) that is connected to the active drive unit (20). The detailed circuit connection of each unit (10~80) is shown in FIGS. 4~7, wherein a full-bridge converter is used to be the power converter (30) in the present invention. If choosing a push-pull converter or a half-bridge converter to replace the full-bridge converter to be the power converter (30), the function of the power converter (30) is still the same. A pulse transformer is applied to be the active drive unit (20) in this present invention.

The input voltage reducing unit (50) receives an input voltage from the power supply unit (10) for providing a proportionally reduced input voltage to the microprocessor (70). Similarly, the output voltage reducing unit (60) receives an output voltage from the output unit (40) and provides a proportionally reduced output voltage to the microprocessor (70).

The microprocessor (70) receives the proportionally reduced input voltage and the proportionally reduced output voltage so as to output a control clock signal. The microprocessor (70) further outputs a simulated output voltage to the PWM controller (80) according to the proportionally reduced output voltage. Once the simulated output voltage is inputted to the PWM controller (80), a voltage feedback control loop is completed. Both the control clock signal and the simulated output voltage decide the duty cycle of the PWM controller (80). By controlling the dead-time value of the PWM controller (80), the PWM controller (80) controls the allowable maximum duty cycle of the active drive unit (20). When the active drive unit (20) is turned on and turned off by the decided duty cycle, the power converter (30) transfers the power from the power supply unit (10) to the output unit (40). In order to obtain a high efficiency of power transmission, appropriately control the dead-time value of the PWM controller (80) could control the input current by limiting the duty cycle and also keep the frequency response. Hence an input interrupt process program and an output interrupt process program are written in the microprocessor (70) for calculating the dead-time value.

The input interrupt process program and the output interrupt process program calculate the necessary dead-time value of the PWM controller (80) respectively according to the proportionally reduced input voltage and the proportionally reduced output voltage. When the dead-time value of the PWM controller (80) is decided, the microprocessor (70) outputs the control clock signal according to the calculated dead-time value to control the PWM controller (80).

The main conception about how to decide the dead-time value is described below:

In the power converter (30), by appropriately choosing the inductance value of the secondary side of the power converter (30), the power converter (30) is able to be operated in the continuous mode condition. The relationship between the input voltage, inductance and the duty cycle of the power converter (30) is listed as shown in equation (I).

$$L_{pri} \cdot \frac{\Delta I_{SW}}{D_{ON}} \cdot f_S = V_{IN} \tag{I}$$

In equation (I), "$L_{pri}$" represents the inductance value that the secondary side inductance value of the power converter (30) reflects to the primary side of the power converter (30), "$\Delta I_{SW}$" represents the variation value of the input current in the primary side of the power converter (30), "$D_{ON}$" represents the duty cycle of the PWM controller (80), "$f_s$" represents the operating frequency and "$V_{IN}$" represents the input voltage.

When the output voltage of the power converter (30) is maintained to be a constant value in continuous mode, the input voltage of the power converter (30) and the duty cycle ($D_{ON}$) of the PWM controller (80) are in an inverse proportion relationship, and the maximum duty cycle of the PWM controller (80) is able to be obtained.

However, the above equation (I) only represents the relationship between the "average" duty cycle and the input voltage. The actual duty cycle is controlled by the voltage feedback loop, and the variation of duty cycle in high input voltage could be larger since the difference of average and limitation of duty cycle is also larger in high input voltage as well.

For steady state response, when the PWM controller (80) is operated under the same limitation of duty cycle, once the input voltage of the power converter (30) is raised, the variation value ($\Delta I_{SW}$) of the input current in the primary side of the power converter (30) could be also raised due to the larger duty-cycle variation.

The relationship between the input current of the power converter (30) and the efficiency of the power converter (30) is listed in equations (II) and (III).

$$\eta = \frac{W_{OUT}}{W_{IN}} \tag{II}$$

In equation (II), "$W_{OUT}$" represents the output power of the power converter (30), "$W_{IN}$" represents the input power of the power converter (30), and "η" represents the efficiency of the power converter (30).

$$W_{IN} = \frac{1}{T_S} \int_0^{T_S} v_{IN} \cdot i_{IN} \, dt, \tag{III}$$

In the equation (III), $v_{IN}$ and $i_{IN}$ respectively represent the input voltage function and the input current function of the power converter (30), and both the two functions varieties with the time. $T_S$ is the duty cycle of the PWM controller (80).

According to the equation (III), when the input current of the power converter (30) is raised, the input power "$W_{IN}$" is also raised, and hence the efficiency of the power converter (30) is decreased. Thus, the limitation of duty cycle also limit the ripple of the input current and hence the system efficiency is raised.

For transient response, when the output voltage of the power converter (30) is suddenly raised, the output ripple voltage is also raised, thus the duty cycle of the PWM controller (80) becomes disproportionate, and hence the limitation of the duty cycle should be recovered under such situation to keep the frequency response.

Generally, the input voltage has less variation than the output voltage, so the sampling time of the input interrupt process program is longer than the sampling time of the output interrupt process program. Hence the dead-time value of the PWM controller (80) is decided by the output interrupt process program in most time. But once the input voltage has unexpected variation, the dead-time value of the PWM controller (80) is decided first by the input interrupt process program and then the output interrupt process program.

Figure 2:
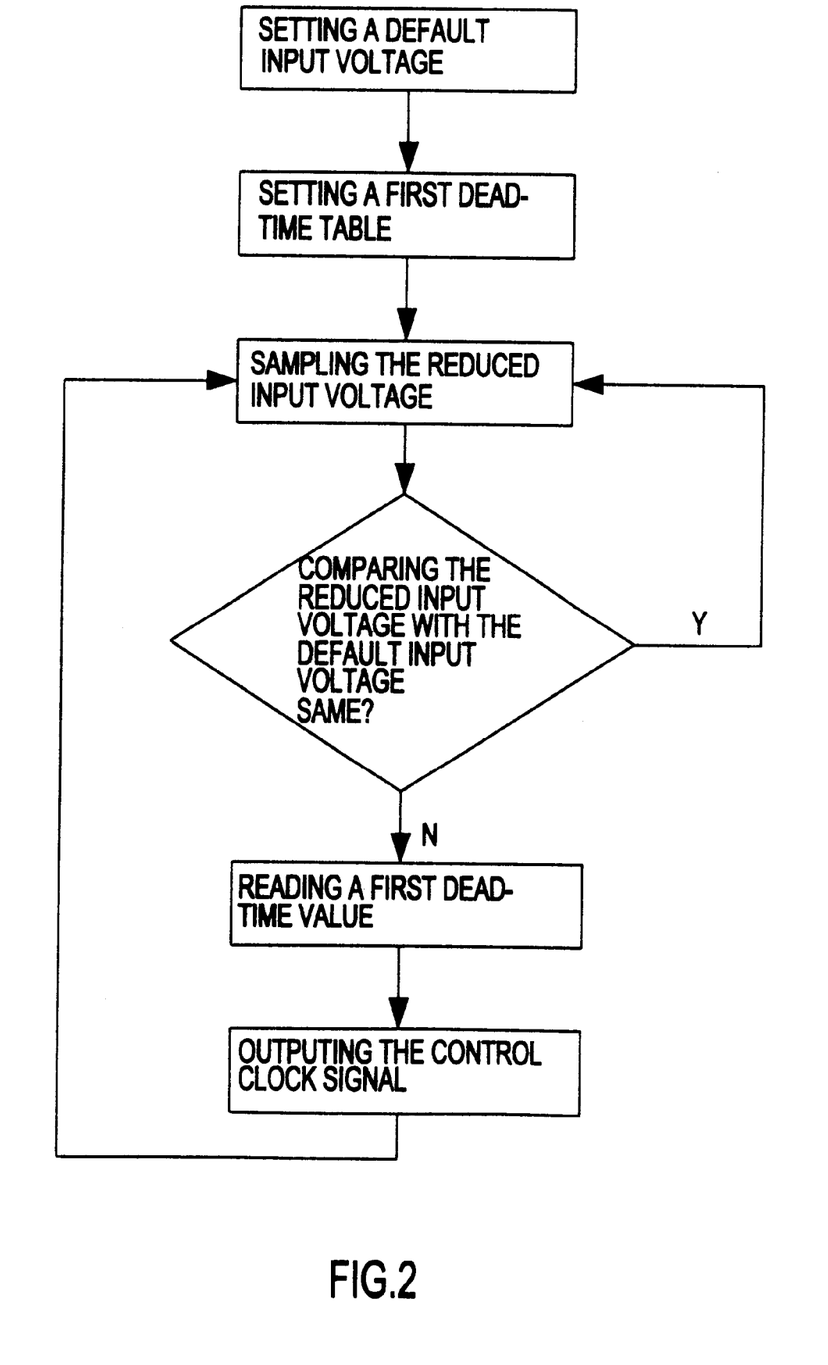
FIG. 2 is a flow chart showing an input interrupt process program in accordance with the present invention.

With reference to FIG. 2, a flow chart of the input interrupt process program is shown, wherein the input interrupt process program comprises the steps of:

(i) setting a default input voltage;
(ii) setting a first dead-time value table;
(iii) sampling the reduced input voltage;
(iv) comparing the reduced input voltage with the default input voltage are the same?;
(v) reading a first-dead time value from the first dead-time value table; and
(vi) outputting the control clock signal;

In the default input voltage setting step, the default input voltage is set in the microprocessor (70). Afterward, the first dead-time value table is set in the microprocessor (70), wherein every dead-time value in the first dead-time value table is set to correspond to different input voltage. In the sampling step, the microprocessor (70) samples the reduced input voltage from the input voltage reducing unit (50), afterward the microprocessor (70) compares the reduced input voltage to the default input voltage. If the reduced input voltage and the default input voltage are different, the microprocessor (70) proceeds to read the first dead-time value from the first dead-time value table according to the reduced input voltage and change the default input voltage to the current input voltage. After obtaining the first dead-time value, the microprocessor (70) outputs the control clock signal according the first dead-time value to control the PWM controller (80).

Figure 3:
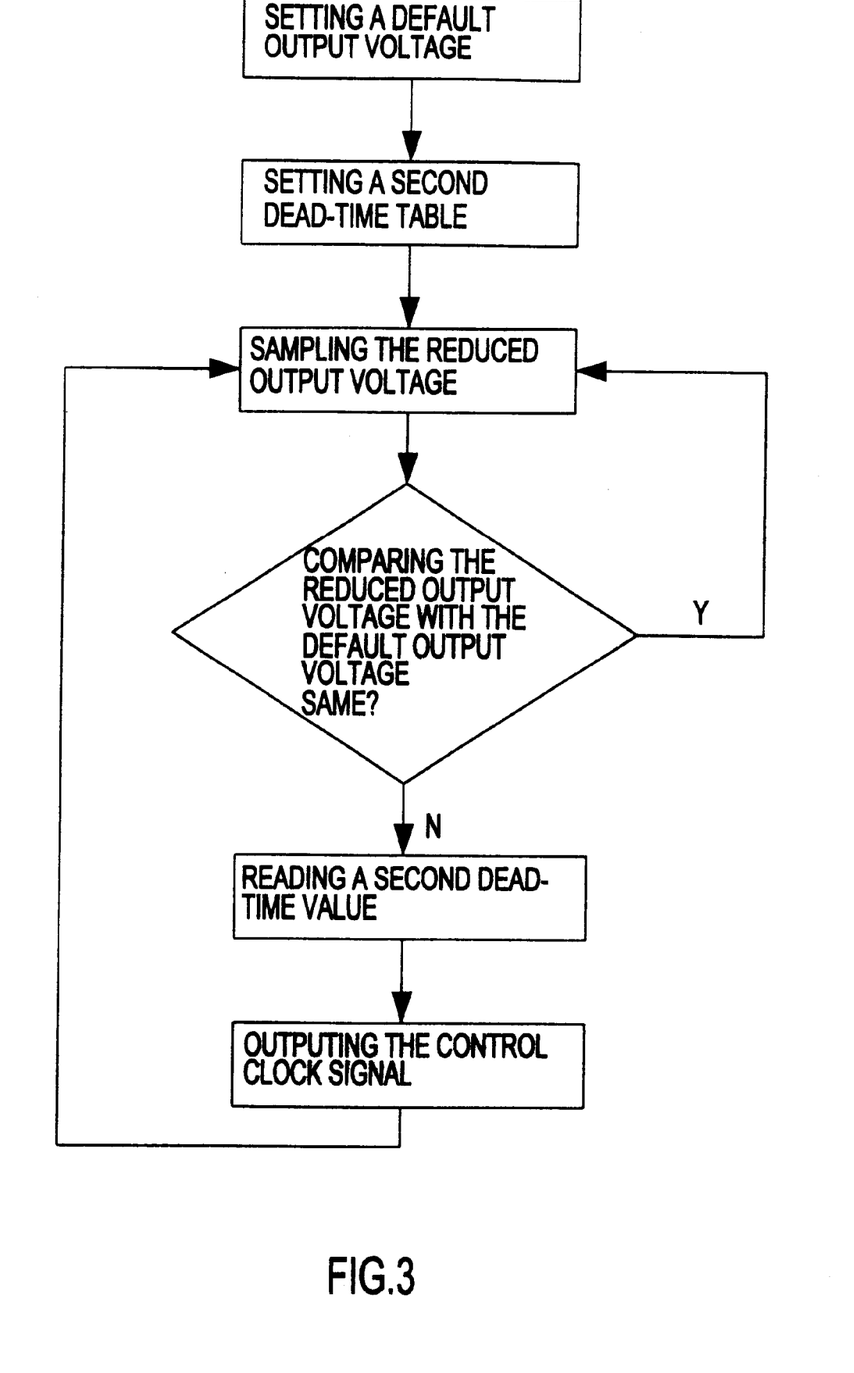
FIG. 3 is a flow chart showing an output interrupt process program in accordance with the present invention.
Figure 4:
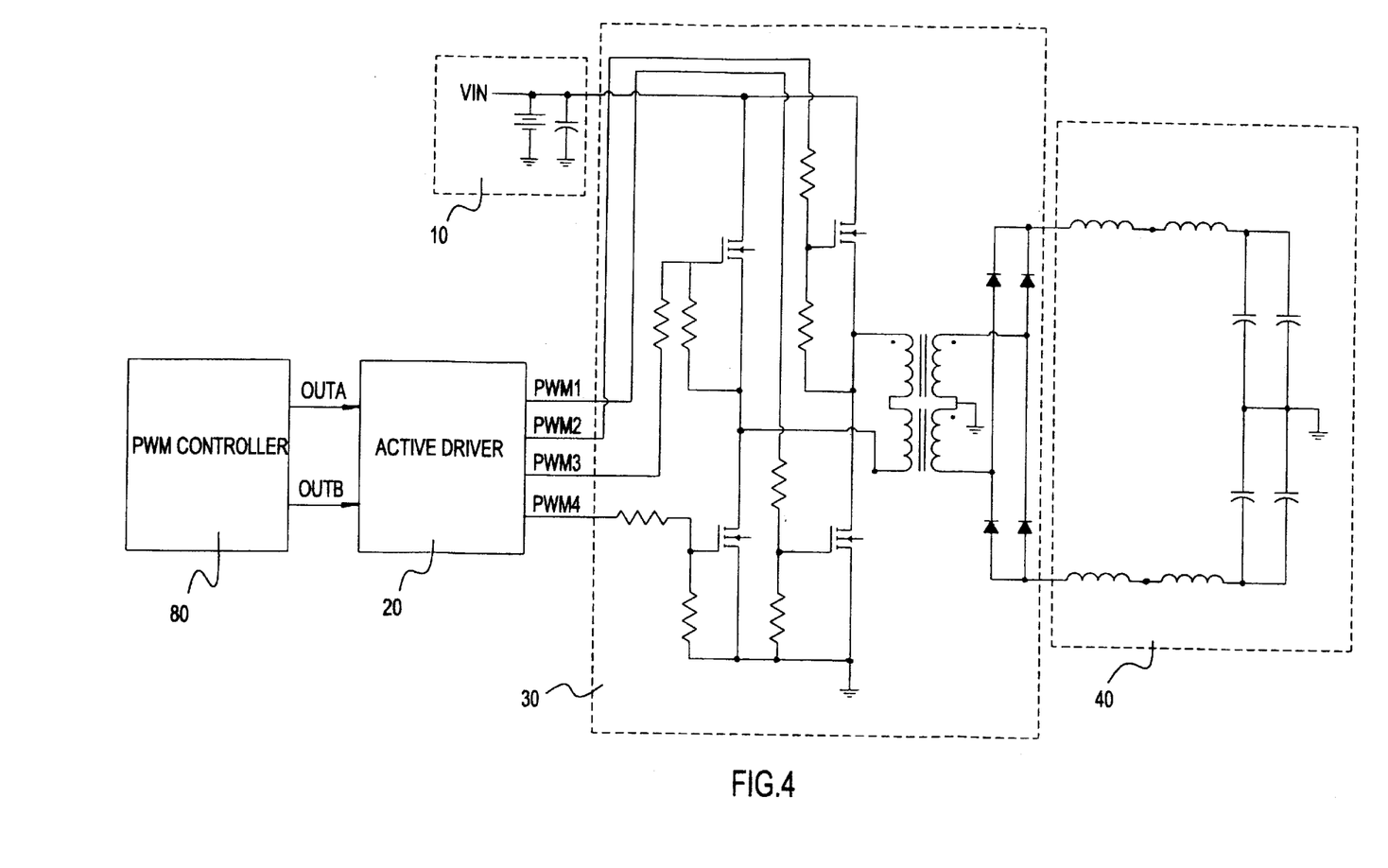
FIG. 4 is a circuit diagram of a power supply unit, a power converter and an output unit in accordance with the present invention.
Figure 5:
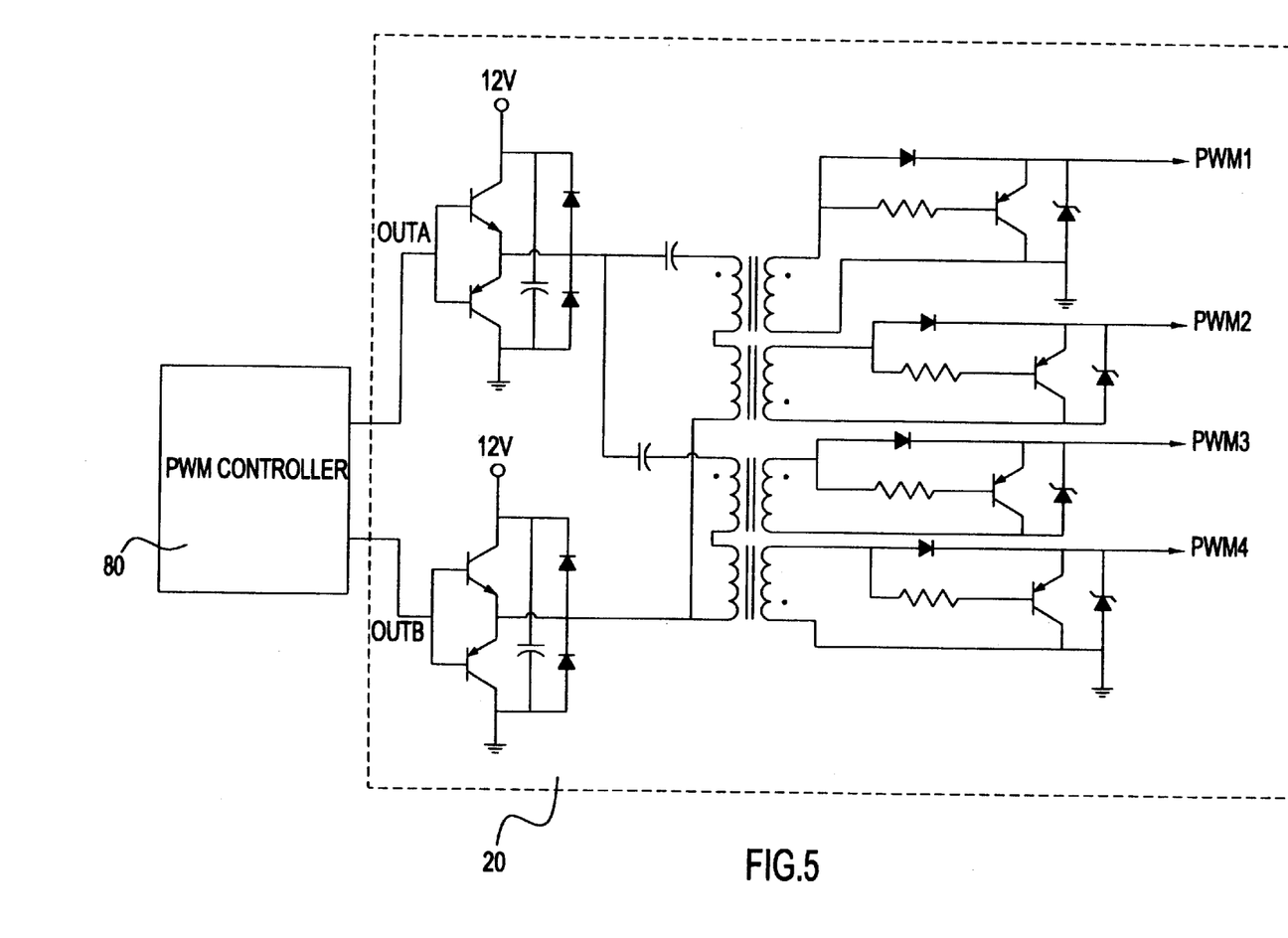
FIG. 5 is a circuit diagram of an active drive unit in accordance with the present invention.
Figure 6:
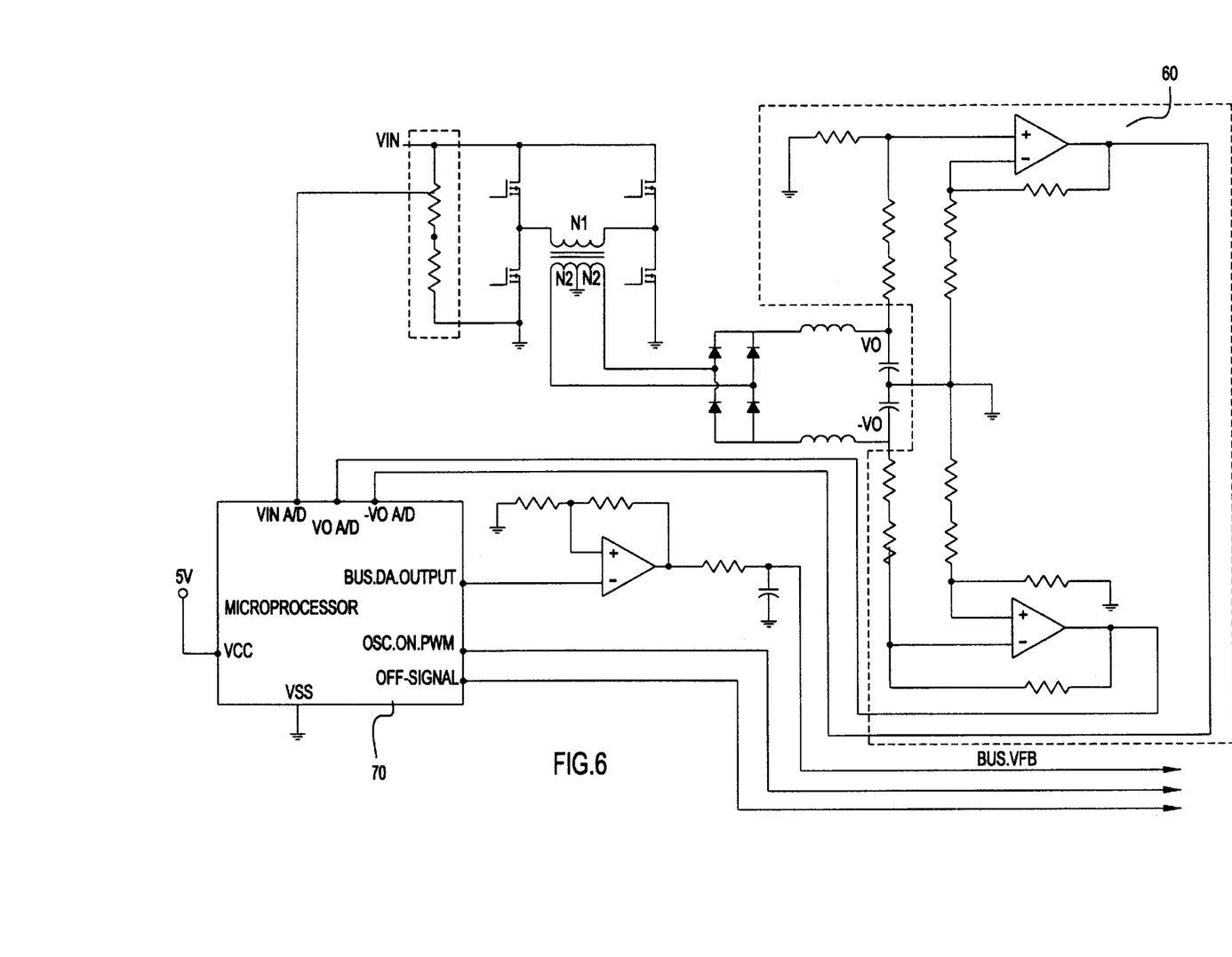
FIG. 6 is a circuit diagram of an input voltage reducing unit, an output voltage reducing unit and a microprocessor in accordance with the present invention.
Figure 7:
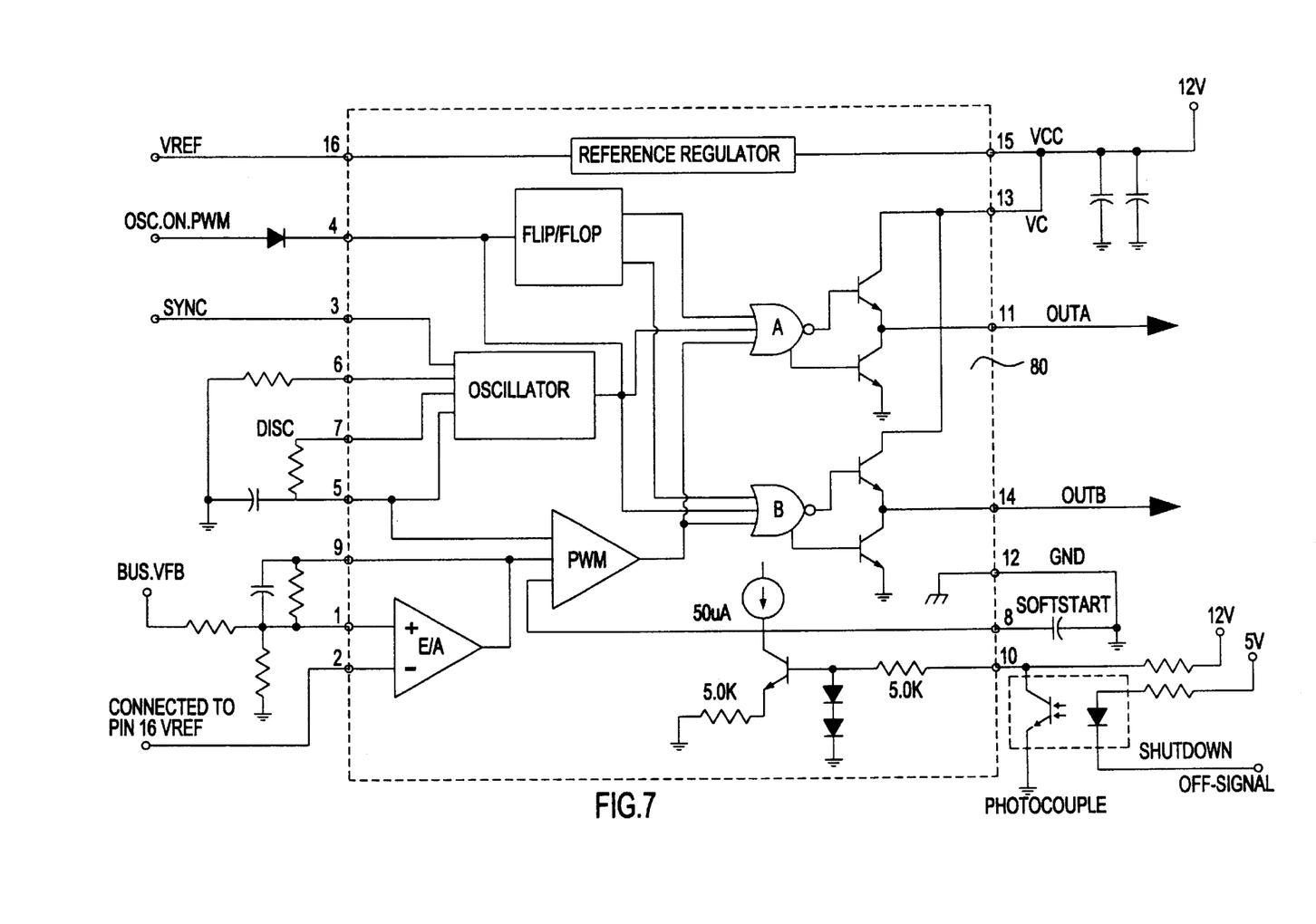
FIG. 7 is a circuit diagram of a PWM controller in accordance with the present invention.

With reference to FIG. 3, a flow chart of the output interrupt process program is shown, wherein the output interrupt process program comprises the steps of:

(i) setting a default output voltage;
(ii) setting a second dead-time value table;
(iii) sampling the reduced output voltage;
(iv) comparing the reduced output voltage with the default output voltage are the same?;
(v) reading a second-dead time value from the second dead-time value table; and
(vi) outputting the control clock signal;

In the default output voltage setting step, the default output voltage is set in the microprocessor (70). Afterward, the second dead-time value table is set in the microprocessor (70), wherein every dead-time value in the second dead-time value table is set to correspond to different output voltage. In the sampling step, the microprocessor (70) samples the reduced output voltage from the output voltage reducing unit (50), afterward the microprocessor (70) compares the reduced output voltage to the default output voltage. If the reduced output voltage and the default output voltage are different, the microprocessor (70) proceeds to read the second dead-time value from the second dead-time value table according to the reduced output voltage. After obtaining the second dead-time value, the microprocessor (70) outputs the control clock signal according the second dead-time value to control the PWM controller (80).

Because the sampling time of the input interrupt process program and the output interrupt process program are different, the control clock signal is only decided by one of the two interrupt process program.

According to the aforementioned description, the high frequency, voltage feedback control mode power converter has following advantages:

1. The microprocessor (80) outputs the simulated output voltage to control the PWM controller (80) instead of directly outputting a feedback output voltage, hence the noise signal of the output voltage is filtered by the microprocessor (80) and the frequency response of the output voltage is improved.

2. The dead-time of the PWM controller (80) is controlled by the microprocessor (80), and hence the resolution is greatly raised so that the power converter is easily to obtain a high efficiency power transmission.

Although the present invention has been explained in relation to its preferred embodiment, it is to be understood that many other possible modifications and variations can be made without departing from the spirit and scope of the invention as hereinafter claimed.

What is claimed is:

1. A high frequency, voltage feedback control mode power converter comprising:
   a power supply unit;
   an active drive unit connected to the power supply unit;
   a power converter connected to the active drive unit for power converting;
   an output unit connected to the power converter;
   a PWM controller connected to the active drive unit for outputting a signal to control the active unit to be selectively activated; and
   a microprocessor connected to the power supply unit, the output unit and the PWM controller, wherein the microprocessor respectively receives an output voltage and input voltage from the output unit and the power supply unit for processing by an output interrupt process program and an input interrupt process program so as to output a control clock signal to control a dead-time value of the PWM controller.

2. The high frequency, voltage feedback control mode power converter as claimed in claim 1, the high frequency, voltage feedback control mode power converter further comprising:
   an input voltage reducing unit connected between the power supply unit and the microprocessor for providing a proportionally reduced input voltage to the microprocessor; and
   an output voltage reducing unit connected between the output unit and the microprocessor for providing a proportionally reduced output voltage to the microprocessor.

3. The high frequency, voltage feedback control mode power converter as claimed in claim 2, wherein the active drive unit is a pulse transformer.

4. The high frequency, voltage feedback control mode power converter as claimed in claim 2, wherein the power converter is a full-bridge converter.

5. The high frequency, voltage feedback control mode power converter as claimed in claim 4, wherein the active drive unit is a pulse transformer.

6. The high frequency, voltage feedback control mode power converter as claimed in claim 1, wherein the active drive unit is a pulse transformer.

* * * * *